United States Patent [19]

Mürawski et al.

[11] Patent Number: 4,570,565
[45] Date of Patent: Feb. 18, 1986

[54] METHOD AND CIRCUIT ARRANGEMENT FOR PROVIDING DATE AND TIME INFORMATION IN A TELEX AND DATA SWITCHING SYSTEM

[75] Inventors: Peter Mürawski; Wolfgang Mayer, both of Munich, Fed. Rep. of Germany

[73] Assignee: Siemens Aktiengesellschaft, Berlin and Munich, Fed. Rep. of Germany

[21] Appl. No.: 653,659

[22] Filed: Sep. 21, 1984

[30] Foreign Application Priority Data

Sep. 23, 1983 [DE] Fed. Rep. of Germany ....... 3334529

[51] Int. Cl.⁴ ............................................. H04L 13/08
[52] U.S. Cl. ...................................... 178/2 R; 178/3
[58] Field of Search ....................... 178/2, 3, 2 E, 17.5

[56] References Cited

U.S. PATENT DOCUMENTS 4,497,976 2/1985 Torggler et al. ....................... 178/3

FOREIGN PATENT DOCUMENTS 087760 9/1983 European Pat. Off. .

OTHER PUBLICATIONS

International Telex Service through Computerized Line Switching, by Peter J. Klein, proceedings of the National Electronics Conference, Oct. 1966, Chicago.

Primary Examiner—Stafford D. Schreyer
Attorney, Agent, or Firm—Thomas H. Jackson

[57] ABSTRACT

Date and time information are provided in a telex and data switching system (EDS), which is connected with subscriber stations (Ttx) that are located in different time zones (ZZ1 to ZZ4). The telex and data switching system makes available a number of current date and time information items assigned to the respective individual time zones that correspond to the number of time zones to be taken into consideration. From these date and time information items there is selected, in the course of the establishing of connections, the date and time information corresponding to the subscriber stations involved in these connections, which is then made available for transmission to these subscriber stations information.

5 Claims, 1 Drawing Figure

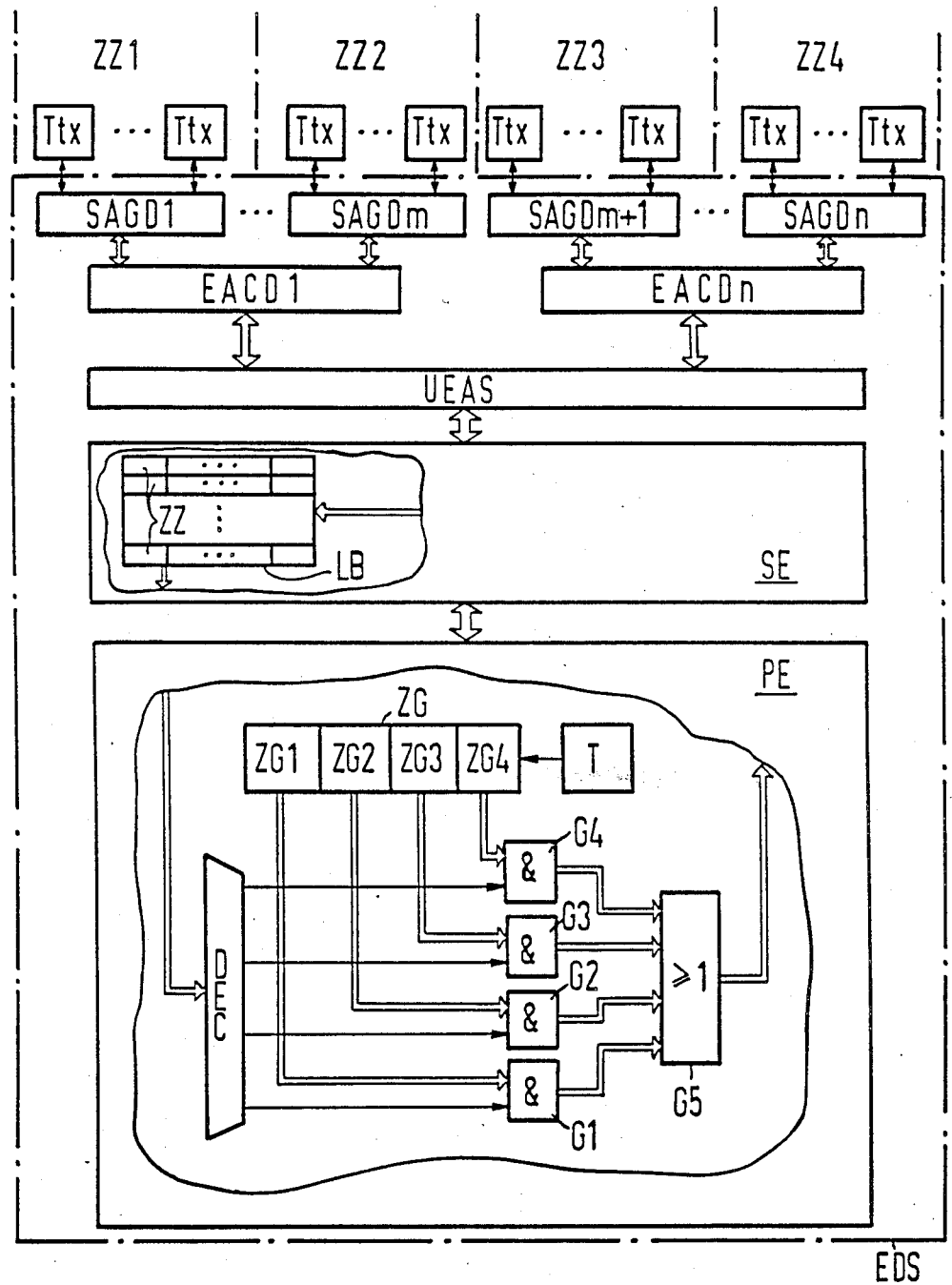

4,570,565

METHOD AND CIRCUIT ARRANGEMENT FOR PROVIDING DATE AND TIME INFORMATION IN A TELEX AND DATA SWITCHING SYSTEM

BACKGROUND OF THE INVENTION

The invention concerns a method and a circuit arrangement for providing date and time information in a telex and data switching system, which is connected with subscriber stations located in different time zones. The date and time information is transmitted at least to the calling subscriber station in the course of the establishment of connections.

In various known procedures for the transmission of telex characters and data signals in switching networks, provision is made for date and time information to be transmitted in the course of the establishment of connections to the respective calling subscriber station or even to both of the subscriber stations that participate in the connection. This date and time information is provided by the telex and data switching system in the switching network, which is connected with these subscriber stations. If the telex and data switching system and the subscriber stations connected with it are at such a distance from one another that they lie in different time zones, the date and time information supplied by the telex and data switching system will not correspond to the actual date and time at the location of the subscriber stations.

SUMMARY OF THE INVENTION

The principal object of the present invention is to provide a method as well as a circuit arrangement by which, in a relatively simple manner, date and time information can be furnished in a telex and data switching system, which corresponds to the actual date and time at the locations of the subscriber stations that are connected with this system.

This object, as well as other objects and advantages which will become apparent from the discussion that follows, are achieved, according to the invention, by storing in the telex and data switching system for each of the subscriber stations data defining the time zones that are of importance to it, by providing in the telex and data switching system a number of actual date and time information items assigned to the respective individual time zones that correspond to the number of time zones to be taken into consideration, and by selecting, in the course of establishing of the connections, the date and time information that corresponds to the latter, and making it available for transmission to these subscriber stations.

The invention has the advantage that there can be made available in the telex and data switching system, without a substantial dynamic load, current date and time information for any and all desired time zones, which can be transmitted to the respective subscriber stations in the course of establishing the connections.

For the implementation of the process in accordance with the invention it is desirable to provide in the telex and data switching system (1) a memory unit with storage cells assigned to the individual subscriber stations and (2) a number of timing signal generators corresponding to the time zones that are to be taken into consideration and which produce the actual date and time information associated with each time zone. Each of the timing signal generators is connected with a selection circuit that, in the course of establishing connections and with the aid of the data stored in the memory unit for the subscriber stations involved, selects the date and time information corresponding to the latter and makes it available at its output for transmission to those subscriber stations involved. This circuit arrangement has the advantage of requiring a minimum amount of circuitry.

For a full understanding of the present invention, reference should now be made to the following detailed description of the preferred embodiments of the invention and to the accompanying drawing.

BRIEF DESCRIPTION OF THE DRAWINGS

The single FIGURE is a block circuit diagram of a telex and data switching system incorporating the present invention.

DESCRIPTION OF THE PREFERRED EMBODIMENTS

The telex and data switching system "EDS" shown in the FIGURE has a number of line terminator groups, among which are the groups SAGD1, SAGDm, SAGDm+1, and SAGDn. Each of these line terminator groups is connected with a large number of transmission lines over which a synchronous transmission procedure takes place. Office telex terminals, designated in the FIGURE by "Ttx" and which are also referred to as "teletex" terminals, can be connected to these transmission lines. The synchronous transmission procedure to be used for data transmission in a public switching network might, for example, be specified by CCITT Recommendation X.21.

The transmission of data to or from a telex data switching system in this case takes place in the form of signal groups that are also referred to as "envelopes". The teletex terminals that are connected to the individual line terminator groups may, for example, be located in different time zones. As shown in the FIGURE each line terminator group is connected with teletex terminals in a separate time zone. These time zones are designated with the symbols ZZ1 to ZZ4. In this case, the line terminator group SAGD1 is assigned to time zone ZZ1, the line terminator group SAGDm to time zone ZZ2, the line terminator group SAGDm+1 to time zone ZZ3 and the line terminator group SAGDn to time zone ZZ4.

The above-mentioned line terminator groups, which are used to receive and transmit signals according to a synchronous transmission procedure are themselves arranged in groups. A first group, which includes the line terminator groups SAGD1 to SAGDm, is connected to an input/output code converter EACD1. The second group, which includes the remaining line terminator groups SAGDm+1 to SAGDn, is connected to an input/output code converter EACDn. The purpose of these input/output code converters is, among other things, to forward signals conducted over the individual line terminator groups to the actual processing section of the telex and data switching system EDS or to forward from this processing section signals that are to be transmitted over the line terminator groups. The input/output code converters are connected for this purpose with a communication sequence control UEAS. This communication sequence control controls the exchange of signals between the input/output converters and a storage unit SE, which forwards the signals fed to it by the communication sequence control to a program control unit PE. In addition, the storage unit SE transmits the signals fed to it by the program control unit to the communication sequence control UEAS.

The above-mentioned storage unit SE has, among other things, a data storage LB with memory locations individually assigned to the different transmission lines. In each of these memory locations, there are stored data describing a respective tranmission line connected with the telex and data switching system EDS. These data include, for example, the transmission speed on the line in question and the terminal identification code of the teletex terminal that is connected with the respective line. In addition, in each of the above-mentioned memory locations there is a storage cell, identified in the FIGURE by ZZ, in which are stored data concerning the time zone applicable to the teletex terminal that is connected to the respective transmission line.

The FIGURE shows only that part of the circuitry of the above-mentioned program control unit that is used to provide the date and time information for the individual teletex terminals. This part of the circuitry includes a timing signal generator array ZG with a number of individual timing signal generators ZG1, ZG2, ZG3 and ZG4. These timing signal generators consist of electronic clocks which supply at their outputs the actual date and time information for the various time zones. The number of timing signal generators in this case corresponds to the number of time zones that are to be taken into consideration by the telex and data switching system EDS. In the embodiment shown in the FIGURE there are four timing signal generators ZG1 to ZG4, corresponding respectively to the four different time zones ZZ1 to ZZ4.

The timing signal generators ZG1 to ZG4 emit the date and time information in coded form. The code used for this purpose is determined by the transmission procedure which is provided for the transmission of signals on the various lines connected between the subscriber stations and the telex and data switching system. If the signals are transmitted in accordance with CCITT Recommendation X.21, as indicated above, then the date and time information from the individual timing signal generators is encoded according to international alphabet IA No. 5.

The individual timing signal generators ZG1 to ZG4 in the timing signal generator array ZG are all connected with a common clock generator T and are thereby synchronized.

Each of the timing signal generators is connected at its outputs, at which the coded date and time information is emitted in parallel form, with an array of AND-gates. There are thus a total of four AND-gate arrays, corresponding to the four timing signal generators. These arrays are numbered consecutively G1 to G4 in the FIGURE, with the numbers indicating to which of the timing signal generators ZG1 to ZG4 they belong. The AND-gate arrays G1 to G4 are only symbolically represented in the FIGURE as individual elements. Each of these AND-gate arrays has internally a number of individual AND-gates corresponding to the number of outputs of its respective timing signal generator. These gates can be switched to their blocking state or transmitting state via a common internal control line. An input of each of the AND-gate arrays, which is connected to this internal control line, is also connected in each case to an output of a decoding device DEC. In accordance with the signals fed to it at its inputs, this decoding device switches only one of the AND-gate arrays to the transmitting state, while all the other AND-gate arrays are in their blocking state.

The outputs of the individual AND-gate arrays G1 to G4 are connected with inputs of an OR-gate array G5. This OR-gate array is also shown in the FIGURE only symbolically as a single element. It contains a number of individual OR-gates corresponding to the number of outputs of each of the AND-gate arrays. These OR-gates have four inputs, corresponding to the total number of AND-gate arrays.

The provision of current date and time information is now accomplished with the aid of the circuit arrangement explained above, in the following manner: First, in the course of establishing a connection—for example, after reception of the call signal generated by the calling teletex terminal—the call is routed to the memory location in the data storage LB of the storage unit SE that corresponds to the calling teletex terminal. When this routing takes place, the storage cell ZZ is read out of this memory location. As mentioned above, this storage cell contains data defining the time zone applicable to the corresponding teletex terminal. These data are fed as input signals to the decoding device DEC. In accordance with these data, the device DEC switches to the transmitting state only that AND-gate array (G1 to G4) whose timing signal generator emits at its outputs the current date and time information for the specific time zone in question. The remaining AND-gate arrays remain blocked. The date and time information that is present at the outputs of the AND-gate array that is actually in the transmitting state are finally received at the OR-gate array G5, which then makes them available for transmission to the calling teletex terminal. If, according to the transmission procedure used for the transmission of signals to and from the subscriber stations, date and time information is also to be transmitted in the course of the establishment of a connection to the called teletex terminal that is participating in the connection, then the current date and time information are made available for this teletex terminal in the same way that has just been described. This date and time information may be different from that of the calling teletex terminal if the two teletex terminals participating in the connection are in different time zones.

So far we have considered only the case in which teletex terminals are connected to the telex and data switching system EDS and in which a synchronous transmission procedure is used for transmission to or from these teletex terminals. The invention is not limited to this situation, however. Instead, date and time information that is specific to various time zones can be made available in the telex and data switching system for any desired transmission procedure. For example, it is also possible, in the case of connections that are established between telex terminals, to transmit date and time information corresponding to the applicable time zones to the telex terminals participating in these connections.

The circuit arrangement provided in the program control unit PE to make available the date and time information can also be configured in a different manner by connecting together the mutually corresponding outputs of the timing signal generators ZG1 to ZG4. In this case the decoding device DEC is connected to each timing signal generator and enables only the outputs of only one of these signal generators for the release of date and time information. The outputs of the other timing signal generators are kept in a state of high impedance. When the timing signal generators are designed in this manner, the AND-gate arrays G1 to G4 and the OR-gate array G5, which are shown in the FIGURE, can be eliminated.

Instead of the central memory configuration LB provided in the storage unit SE for the storage of data relating to the time zones assigned to the subscriber stations, and instead of the circuit arrangement set up in the program control unit PE to make available this date and time information, it is also possible to provide, in each of the line terminator groups SAGD1 to SAGDn, a circuit arrangement of this kind as well as a memory having a number of storage cells corresponding to the number of subscriber stations connected with the respective line terminator group. In this case it is advantageous if the timing signal generator arrays located in the line terminator groups are synchronously controlled by a single clock generator located in the program control unit.

Finally, it should also be noted that, while it is indicated in the FIGURE that the subscriber stations connected with a single line terminator group are all located in the same time zone, this is not necessary for the present invention. Instead, the subscriber stations connected with a common line terminator group may be also located in different time zones.

There has thus been shown and described a novel method and circuit arrangement for providing date and time information in a telex and data switching system which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method for providing date and time information in a telex and data switching system connected with subscriber stations that are located in different time zones where the date and time information is transmitted at least to the calling subscriber station during the course of the establishing a connection, said method comprising the steps of:

(a) storing data in said telex and data switching system representing the time zone of each one of said subscriber stations;
   (b) making available, on a continuous basis in said telex and data switching system, current date and time information for each different time zone in which said the subscriber stations are located;
   (c) when establishing a connection between subscriber stations, selecting the current date and time information of at least the calling subscriber station by means of said data representing the time zone of said calling station; and
   (d) transmitting the selected date and time information at least to said calling station.

2. The method recited in claim 1, further comprising the steps of selecting the current date and time information of the called subscriber station by means of said data representing the time zone of said called station and transmitting the selected date and time information to said called station.

3. Apparatus for carrying out the method recited in claim 1, wherein said telex and data switching system comprises:

(a) a data store having memory locations assigned to each one of said subscriber stations, each memory location having stored therein said data representing the time zone of its associated subscriber station;
   (b) a plurality of timing signal generators, each of said generators producing signals representing the current date and time in a different time zone; and
   (c) selection circuit means, coupled to said data store and to said timing signal generators, for selecting for transmission the signals representing the current date and time in the time zone of at least a calling subscriber station during the establishment of a connection between a calling and called subscriber station.

4. The apparatus recited in claim 3, wherein said selection circuit means includes means for selecting the current date and time in the time zone of said called subscriber station.

5. The apparatus defined in claim 1, wherein said data store has at least that number of memory locations equal to the number of different time zones in which said subscriber stations are located.

* * * * *